Dec. 5, 1961 TAKAYASU INOUE 3,011,615

MOTOR-DRIVEN CHECKWRITER

Filed May 27, 1959

INVENTOR.
TAKAYASU INOUE

BY *Greene, Pmeles & Durr*

INVENTOR.
TAKAYASU INOUE

United States Patent Office 3,011,615
Patented Dec. 5, 1961

3,011,615
MOTOR-DRIVEN CHECKWRITER
Takayasu Inoue, 838 Rokkakubashi-machi, Kanagawa-ku, Yokohama, Japan
Filed May 27, 1959, Ser. No. 816,101
Claims priority, application Japan May 27, 1958
2 Claims. (Cl. 197—6.4)

This invention relates to a checkwriter adapted to be used to print numerals and characters on checks, receipts and the like business papers, more specifically to those machines of the above kind and motor-driven.

The invention resides in its broader aspect in a motor-driven checkwriter, wherein a dial having a series of characters or numerals corresponding to those on a typing disc and arranged in a circle thereon is rotatably mounted, said disc being arranged to be rotatable in a predetermined relation with respect to said dial, and an electric motor actuates an operating shaft through a clutch mechanism, said shaft operating, at a certain revolutional angle thereof, said disc to make a print and thereafter actuating a paper feed mechanism and said clutch mechanism being operative in cooperation with the revolution of said dial to connect said operating shaft with the prime mover shaft and after a predetermined revolution of the former shaft to disengage said cooperative connection.

It is an object of the invention to provide a checkwriter, wherein by merely turning a dial a type-print may be automatically carried out and by repeating this procedure in succession a plurality of necessary numerals or characters may be mechanically written-in within a minimum time period.

It is another object to provide an improved checkwriter, which is simpler in its design and more sturdy and compact in its construction, without losing the above described improved operation.

Yet a further object of the invention is to provide an improved checkwriter, by which a neat and regular line or lines of numerals or characters may be typewritten, even when they include one or more commas.

Various further and more specific objects, features and advantages of the invention will appear from the description given below, taken in connection with the accompanying drawings illustrating by way of example two preferred embodiments of this invention.

Now, referring to the drawings, especially FIGS. 1–12, inclusive, thereof, 1 denotes a base structure mounting the whole operating mechanism of the motor-driven checkwriter. A supporting frame 2 is fixedly mounted on the base 1 and a type disc-supporting frame 4 is mounted to pivot up and down by means of a lateral pin 3 on the first mentioned frame 2. A type ring or disc 6, known per se, is fixed on the front end of a shaft 5, which is rotatably mounted on the front part of the frame 4. A selector dial 7 is rotatably mounted on a stationary disc 16 by means of a shaft 8 (FIG. 7), said disc being mounted on the front end of a supporting arm 2′ projecting forwardly from the upper part of stationary supporting frame 2. The dial 7 carries thereon a plurality of indicating symbols 9, such as characters and numbers to be written-in, and the corresponding number of finger holes 10, both being arranged in concentric circular rows, while a toothed wheel 11 fixed to the rear surface of the dial engages with a mating gear 12, which is fixedly mounted on an inclined shaft 13 supported on frame 2. A beveled gear 14 is fixedly mounted on the shaft 13 and engages with a gear 15 mounted on the shaft 5 of type ring 6. With suitably selected dimensions of cooperating parts of the aforementioned arrangement, when the dial 7 is rotated through an angle, the type ring 6 is correspondingly turned and the character or number, corresponding to that selected at the time by consulting the symbols carried on the dial, is brought to its service position.

Figure 1:
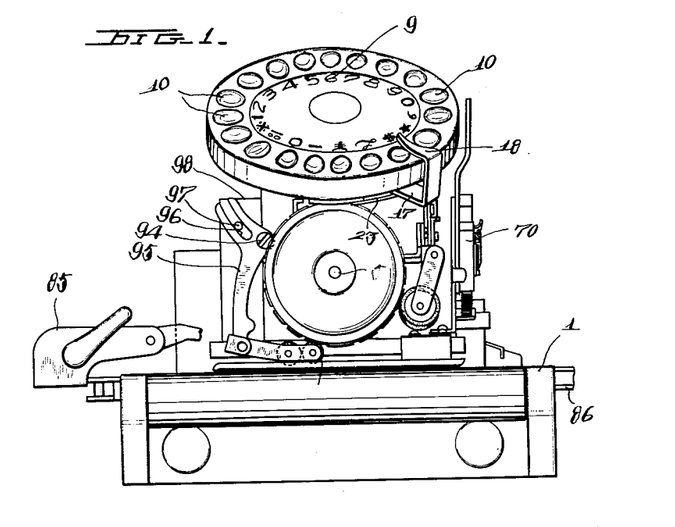
FIG. 1 shows a front view of an embodiment of the invention.
Figure 2:
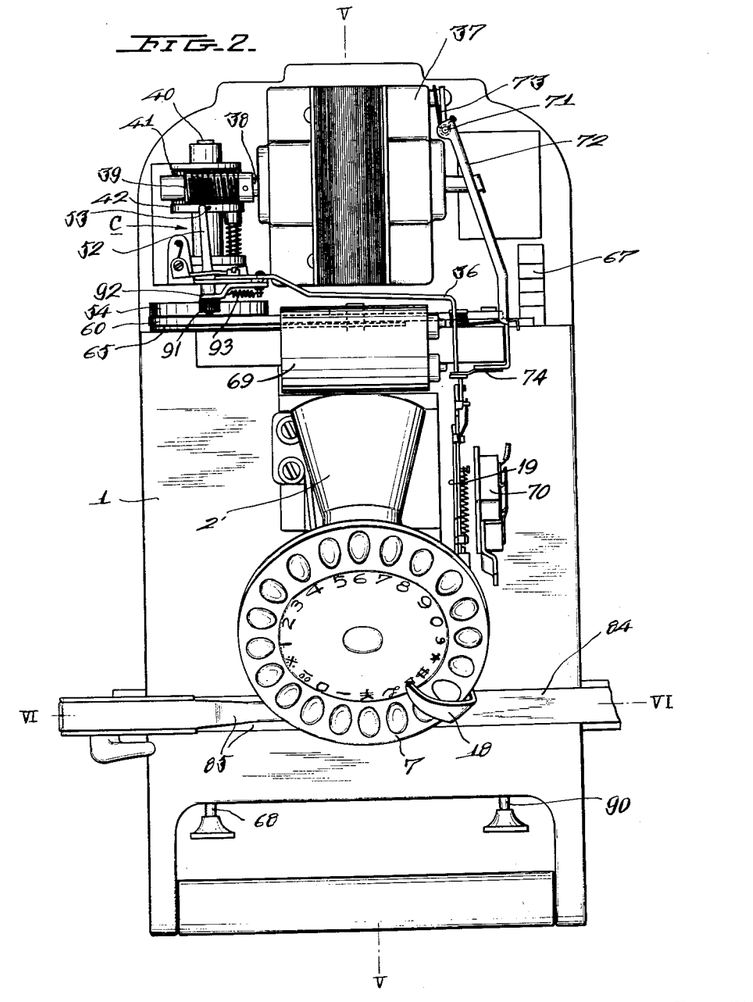
FIG. 2 is a plan view thereof.
Figure 3:
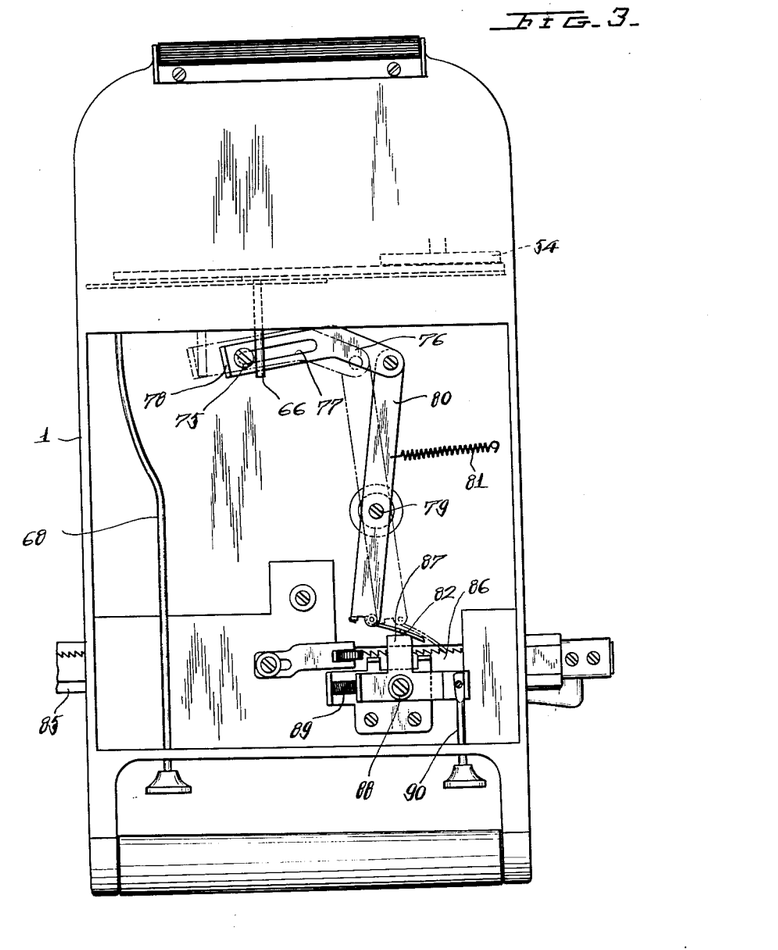
FIG. 3 illustrates a bottom view thereof.
Figures 4, 9:
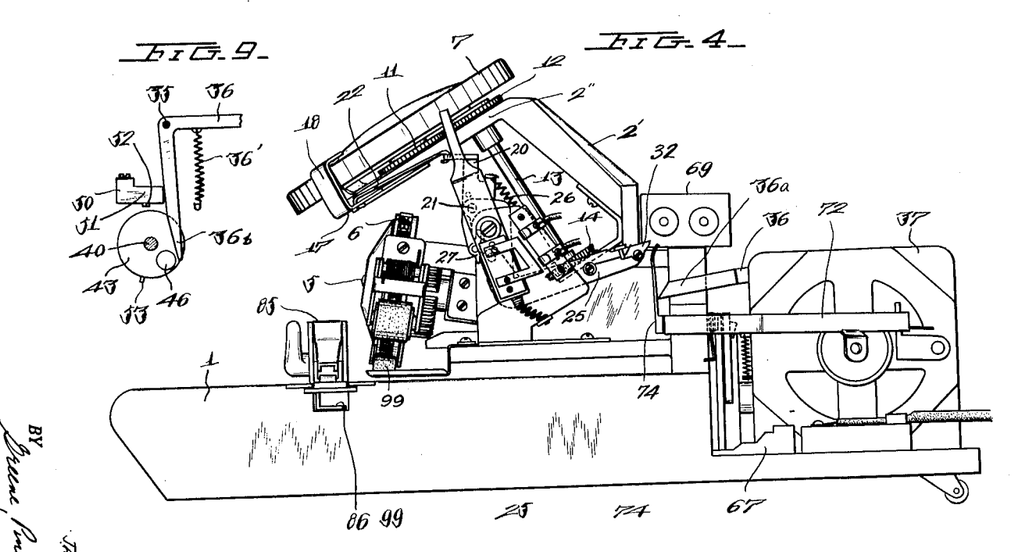
FIG. 4 is a side elevation thereof.
FIG. 9 represents a front view, showing in detail the cooperative relation between the clutch-operating lever and the clutch.
Figures 5, 6, 7:
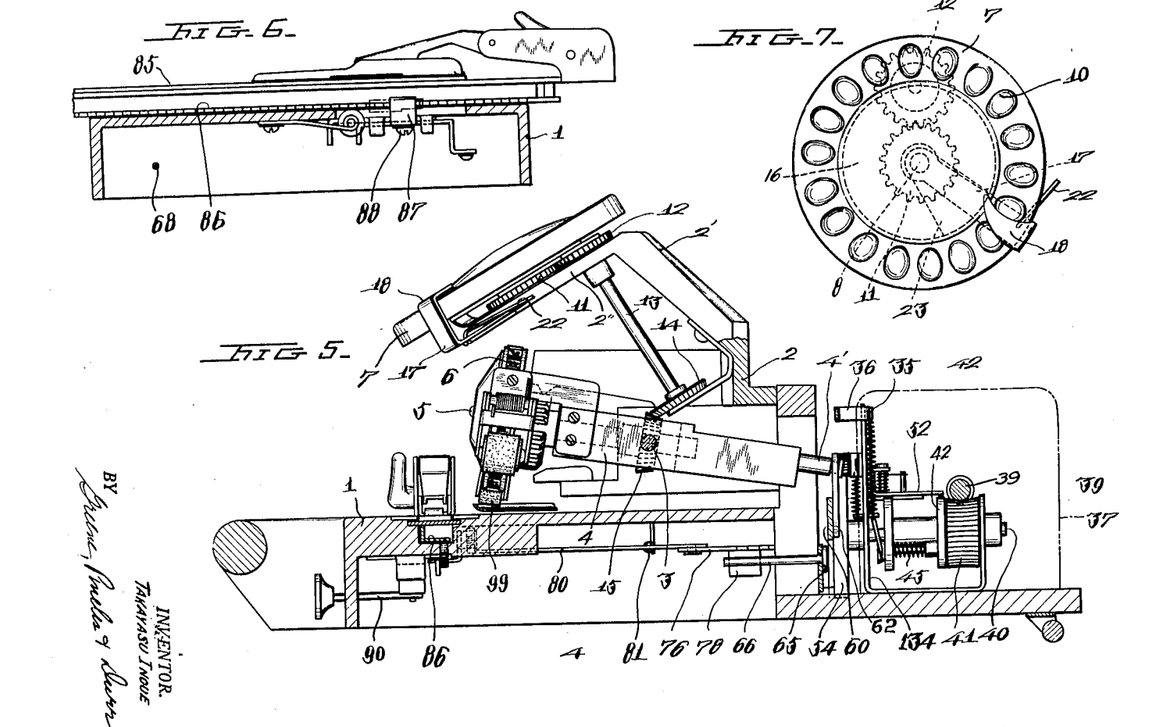
FIG. 5 shows a longitudinal section taken on the line V—V in FIG. 2.
FIG. 6 is a cross-section taken on the line VI—VI in FIG. 2.
FIG. 7 represents a front view of the manipulating dial employed in the machine.
Figure 8:
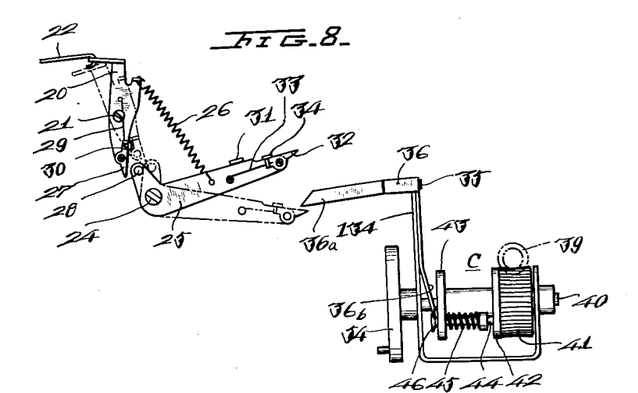
FIG. 8 is a side view of the intermediate mechanism arranged between the dial and the clutch mechanism.
Figure 10:
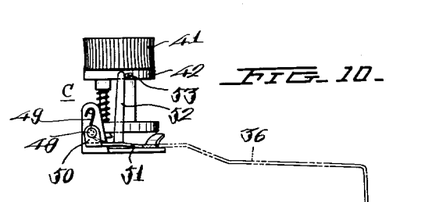
FIG. 10 is a plan view of the mechanism of FIG. 9.
Figure 11:
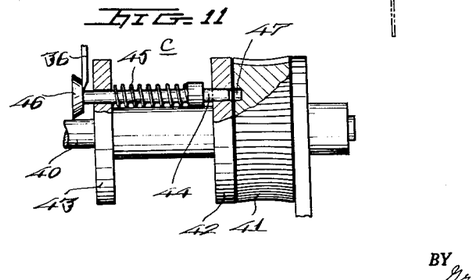
FIG. 11 is an enlarged detail view, illustrating several parts shown in FIG. 10.

An arm 17 is pivoted at its one end on the shaft 8 of dial 7, while the opposite or outer end of said arm is bent around and over the dial to form a movable finger stop 18. The arm 17 is limited in its motion within the limits provided by a sector-shaped large notch 23 cut in the rear surface of disc 16. The arm 17 is connected through a connecting rod 22 with a lever 20 at its upper end, said lever being pivoted by means of a pin 21 on the stationary portion of frame 2. The lever 20 is connected by means of a spring 26 with the horizontal arm of an angle lever 25 (FIG. 8), which is pivoted by means of a pin 24 on stationary supporting plate 19, while a pawl 27 pivoted on the lower part of lever 20 is ready for being engaged by a pin 28, which is mounted on the tip of the vertical arm of the angle lever 25. The pawl 27 bears against a stop 30 under the influence of a spring 29. The lever 25 normally abuts against a stop 31 fixed on the stationary plate 19 and a pawl 32 is mounted pivotally on the rear end of said lever 25 and normally abuts on a further stop 34.

A bearing plate 134 is fixed on the rear part of base 1 and a clutch control lever 36 of inverted L-shape is pivoted on a pin 35 mounted on the plate 134, the tip of a projecting arm 36a extending forwardly from the free end of the upper arm of said lever 36 and projecting into the arc-shaped path of the pawl 32.

Upon the rear part of base 1 is rigidly mounted an electric motor 37, the rotor shaft 38 of which carries a worm 39 fixedly mounted thereon, said worm meshing with a worm wheel 41 loosely mounted on a transmission shaft 40, which is journalled in the bearing plate 134. The shaft contains a clutch mounted thereon, generally denoted by a reference character C and illustrated especially in FIGS. 9–11, through the opposite discs 42 and 43 of which a clutch pin 44 passes loosely and is urged by a coil spring 45 towards the worm wheel 41. From the clutch lever 36 depends an operating arm 36b, the lower end of which extends between the front flange 46 of said clutch pin and the disc 43, the last mentioned pin being thereby disengaged from the side of gear 41. The gear 41 is provided with a recess 47 cut therein adapted to receive the free end of the clutch pin 44. A stopper 50 is pivoted on the bearing plate 134 by means of a pin 48 and acted upon by a spring 49, a first projection 51 extending laterally from said stopper into engagement with the lower arm of lever 36 and a second projection 52 projecting therefrom into the operating range of a pin 53 fixed on the rear disc 42 at its outer periphery.

Figure 12:
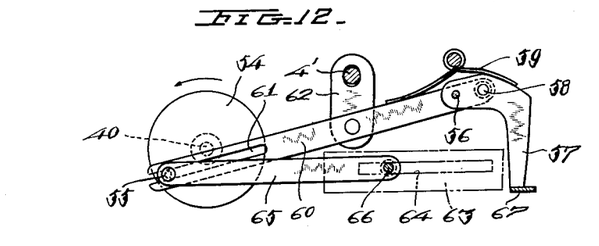
FIG. 12 is a front view of the printing and paper feed driving mechanism.

A crank disc 54 is fixed on the operating shaft 40 at its front end and provided with an eccentric pin 55 fixed thereon, said pin loosely engaging in the left hand slot 61, seen in FIG. 12, which is cut in a vertically swingable rocking arm 60 pivoted by means of a pin 58 at its right hand end on a support 57, the latter being in turn pivoted by means of a pin 56 on the base 1. The rocking arm 60 is further connected at its intermediate point through a link 62 with a shaft 4' projecting from the rear end of the frame 4. As shown in FIG. 12, a forwardly extending, connecting rod 65 is pivoted on the crankpin 55, said rod carrying thereon at its right hand end a pin 66, which loosely engages in a horizontally extending guide slot 64 cut in a guide plate 63, the latter being fixed on base 1. A spring 59 acts by both its legs upon support 57 and rocking arm 60. The support 57 abuts on an abutment piece 67, which is slidably mounted on base 1 and may be changed in its height at three levels. When the abutment piece 67 is shifted forwardly or backwardly by manipulation of the operating rod 68 extending forwardly for operation of said piece, the support 57 is correspondingly rotated about the pivot pin 56 to shift the supporting link 62 into its vertical position, the rear end of type disc-supporting frame 4 being thereby elevated or lowered, as the occasion may desire. With this arrangement, the distance between the type-disc and the paper inserted in position may be adjusted according to the thickness of the paper to be mechanically written-in.

The motor 37 includes a condenser 69 in its operating circuit, and is energized or deenergized by means of a switch 70. This motor 37 is of such a type that upon start thereof, the rotor is slightly shifted in the axial direction (to the right). An arm plate 72 is urged with a slight pressure upon the right hand end of the rotor shaft 38 by a spring 73, said plate 72 being pivoted by means of a pin 71 on the motor framework. A vertical rod 74, as an extension from the forward end of arm plate 72 (see FIG. 4), extends into the gap between the pawl on the rear end of lever 25, and the forward end of the extension 36a of clutch-operating lever 36, but it is retracted from the gap when the motor starts up. With this arrangement, an unintentional typewriting can be effectively prevented.

An intermediate link 76 is provided with a slot 77 cut therein and a stationary pin 75, studded in a bottom recess of base 1 (FIG. 3), loosely engages the slot. The link 76 is provided on its one end with an upright projection 78, which extends into the passage of the forwardly projecting pin 66 of the reciprocatable rod 65. A lever 80 is pivoted at its intermediate portion on the bottom of base 1 by means of a pin 79, said lever being linked at its rear end to the intermediate link 76. A tension spring 81 acts upon the lever 80, on the forward end of which is pivoted a pawl 82, the latter being influenced by the action of spring 83. The pawl 82 projects so as to engage with a rack 86 fixed onto a paper feed bar 85, which is slidably arranged in a lateral guide groove 84.

87 denotes a paper feed adjuster, which is pivoted by means of a pin 88 onto the bottom of base 1 and acted upon at its one end by a spring 89. A forwardly projecting operating rod 90 is connected with the adjuster 87. By manipulating the operating rod, the pawl 82 may be changed in its position relative to the rack 86, thus modifying the feed rate of the paper.

In use of the aforementioned machine, switch 70 is first closed to energize the electric motor 37 and then the operator rotates the dial in the clockwise direction upon inserting his finger's end in a suitable hole 10 corresponding to the desired number or character. By the finger so engaged, the movable finger stop 18 is carried therewith, until the arm 17 is brought into engagement with one side edge of recess 23, thereby stopping the rotation of the dial. This movement of arm 17 causes through the connecting rod 22 the upper end of lever 20 to swivel forwardly (FIG. 8), while at the same time the pawl 27 on the lower end of said lever 25 acts through pin 28 thereupon to swivel lever 25 in the clockwise direction. When the pawl 27 is disengaged from the pin 28, the lever 25 will return to the original position by the action of spring 26. During this turning movement, the pawl 32 engages with the forward end of clutch-operating lever 36 and causes the latter to swivel in the upward direction, because in this case the safety piece 74 is retracted from the gap between two members 32 and 36a due to the operation of the driving motor. Meanwhile, the opposite end 36b of lever 36 is equally retracted from the gap between the clutch disc 43 and the end flange 46 on clutch pin 44. By this operation, the pin 44 is pushed toward the worm wheel 41 by the action of spring 45 and, when the recess 47 on the wheel is brought into registration with the pin 44, the later engages in the recess, the operating shaft 40 being thereby coupled through the clutch with the worm wheel 41. The stopper 50 swivels under the action of spring 49, thus checking the return movement of lever 36. When the operating shaft 40 makes a complete revolution, the pin 53 on the outer periphery of disc 42 acts on the projection 52 on said stopper 50, thus releasing the locking of lever 36, which then moves into the gap between disc 43 and flange 46 and the clutch pin 44 is thereby disengaged from the worm wheel 41. Transmission to the shaft 40 is thereby interrupted. In addition thereto, a recess provided on the outer peripheral surface of the crank disc 54 fixed on the operating shaft 40 is engaged under pressure by a roller 91 mounted on an arm 92 under the action of a spring 93, said recess being positively re-engaged by said roller each time when the disc 54 has made a complete revolution, thereby effectively avoiding any possible over-running of the shaft 40, which assures thereby an accurate complete revolution as necessary.

Each complete revolution of the crank disc 54 will allow the crankpin 55 (FIG. 12) to rock the rocking lever 60 about the pin 58 upwardly and downwardly by a complete cycle, and the type disc-supporting frame 4 operatively connected through link 62 with the lever 60 is thereby caused to rock in turn upwardly and downwardly about the pin 3 to allow the type disc to make a typewriting. It should be noted, however, that an ink-roll support 95 is pivoted by a pin 94 on the front part of said frame 4 and a slot 96 in the support is engaged by a pin 97 fixed on a stationary piece 98 fitted on base 1, so that during the above mentioned operation said support is caused to rock laterally to and fro, and the ink-roll 99 thereby coats the ink upon the corresponding type before it is set in its service position.

With a complete revolution of the crank disc 54, the laterally movable bar 65 is reciprocated once to and fro. During the movement of the bar in the right hand direction, the forwardly projecting pin 66 engages with a projection 78 on the intermediate link 76 (FIG. 3), the lever 80 being thus caused to swivel. The pawl 82 on the front end of lever 80 is thereby caused to engage with the rack 86 on the paper feed rod 85, to shift the rod for the purpose of paper feeding. It should be noted, that the paper feed above mentioned is carried out after completion of each typewriting operation.

Next, a modified form of typewriting device employed in this invention will be described in detail, referring to FIGURES 13–17.

Figures 13, 15:
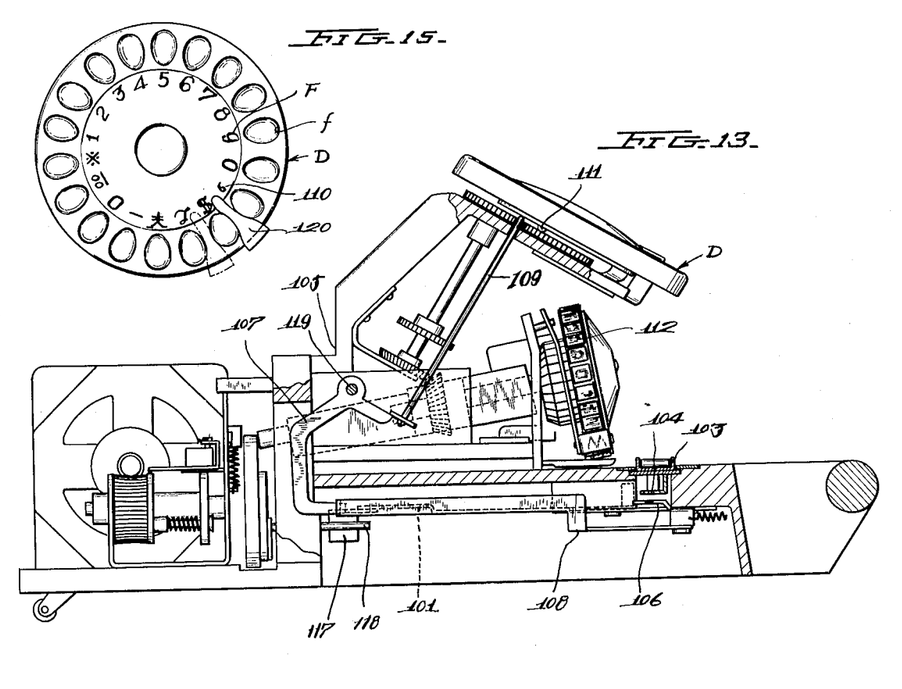
FIG. 13 is a side view, part thereof being sectioned, of a somewhat modified machine according to this invention.
FIG. 15 is a front view of the selector dial employed therein.
Figure 14:
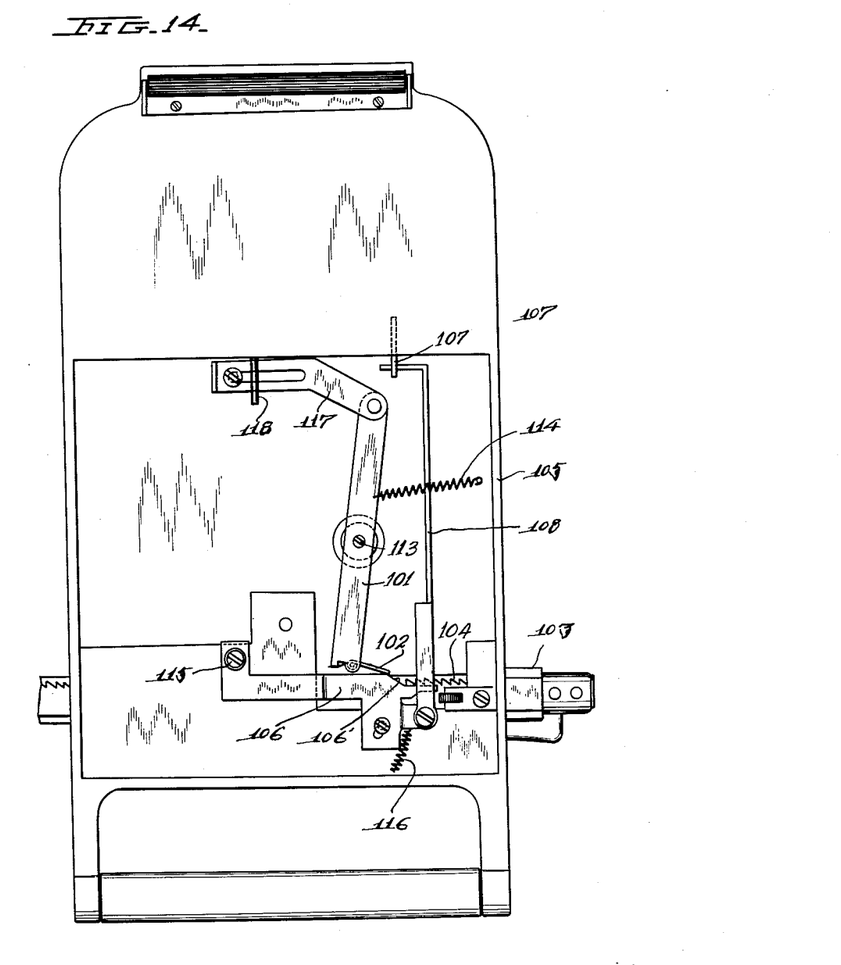
FIG. 14 is a bottom view thereof.
Figure 16:
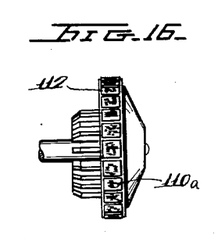
FIG. 16 is a side view of the type disc employed.
Figure 17:
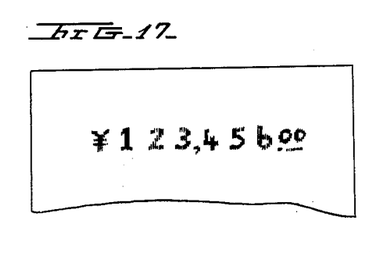
FIG. 17 shows an example of an amount typed by use of the present machine.

In these figures, 113 denotes a pivot pin for the paper feed lever 101; 114 a returning spring for said lever; 115 a pivot pin for a guide control member 106; 116 a returning spring for the latter; 117 a connecting rod, which is pivotally connected with the paper feed lever 101 and adapted to be driven in the paper feed direction by a laterally reciprocatable pin 118; 119 a pivot pin for a lever 107.

The operation of the motor-driven checkwriter according to this embodiment is substantially the same as in the case of the preceding one. Thus, the operator, in operation, inserts his finger's end into a finger hole *f* corresponding to the desired figure or character on the dial D, and turns the latter until the finger stop 120 is carried from the full-lined position to the dash-dotted one, as illustrated in FIGURE 15, thereby causing the transmission mechanism to move the paper feed-operating pin 118 back from the plane of the paper as viewed in FIGURE 13 (or to the left as viewed in FIGURE 14). This motion is transmitted through the connecting rod 117 to the paper feed lever 101, which is thereby caused to swivel in the counterclockwise direction in FIGURE 14 and thus to shift the pawl 102 along the beveled edge 106' on the control member 106. The pawl 102 engages thus with a rack 104 attached to a paper-carrying bar 103, to feed the paper a predetermined distance. Thereupon, the type-disc 12 is lowered to make a print, and so on. Thus, a series of numerals or characters, as shown by way of example in FIGURE 17, may be printed on the feed paper.

In the course of above mentioned printing operation, when the operator turns the dial by inserting his finger end in the hole corresponding to the comman (,) denoted by reference 110, until the dial is brought into the rest position, the projection 111 serves to depress the control bar 109, the connecting rod 108 being thereby withdrawn through the intermediary of lever 107 in the backward direction. This operation causes the control member 106 to swivel in the backward direction, the paper feed pawl 102 being prevented from engaging with the rack 4 by means of the member 106 thus displaced from the regular operative position, while the feed lever 101 is turned in the feeding direction as usual. In this case, the pawl 102 will only slide along the control member 106 in vain, thus no paper feed being provided. As is commonly known, the type carrying comma thereon is arranged on the type disc in a somewhat displaced position as compared to that of any regular number or character. Thus, when it is printed, the printed comma will occupy a somewhat nearer position to the preceding character. However, by using the present embodiment, a newly printed character or numeral following the already printed comma will have a regular space interval relative to the preceding comma, as will be clearly seen from FIGURE 17.

Thus, according to the present embodiment, a comma can be printed within a regular space between any two spaced numerals or characters, thus avoiding otherwise possible excess spacing before as well as after a printed comma, and producing a neat printing including one or more commas, and, indeed, by means of a simpler additional means as explained above.

Although the invention has been described in considerable detail in the foregoing for the purpose of illustration, it is to be understood that such detail is solely for this purpose and that variations can be made therein by those skilled in the art without departing from the spirit and scope of the invention as set forth in the appended claims.

What I claim is:

1. A motor driven checkwriter, comprising a type disc having a plurality of characters thereon for printing onto a check, a dial having a number of characters thereon corresponding to the characters of said type disc, means operatively connecting said type disc to said dial whereby an angular rotation of said dial produces a corresponding angular rotation in said disc to bring a type character on the disc corresponding to the angular rotation into position for printing, an electric motor including a prime mover shaft, an operating shaft, means including a clutch mechanism for operatively connecting the prime mover shaft of said motor to said operating shaft, means for supporting a check to be written, means connectable to said operating shaft to move said disc to print the type character thereon which is in printing position onto a check held in printing position, means associated with said dial for operating said clutch mechanism to operatively connect said operating shaft with the prime mover shaft, and means for disengaging the operating shaft from the prime mover shaft after a predetermined degree of angular rotation of the operating shaft sufficient to make one print of the type character which is in printing position.

2. A motor driven checkwriter as claimed in claim 1, wherein said means for supporting a check comprises a feeding mechanism, and means connected to said operating shaft for operating said feeding mechanism after said operating shaft has moved the disc to print the type character on the check.

References Cited in the file of this patent

UNITED STATES PATENTS 2,699,858    Walborn _______________ Jan. 18, 1955